June 23, 1931.    A. W. ENGEL    1,811,116
PICTURE MOUNTING DEVICE
Filed Dec. 7, 1928
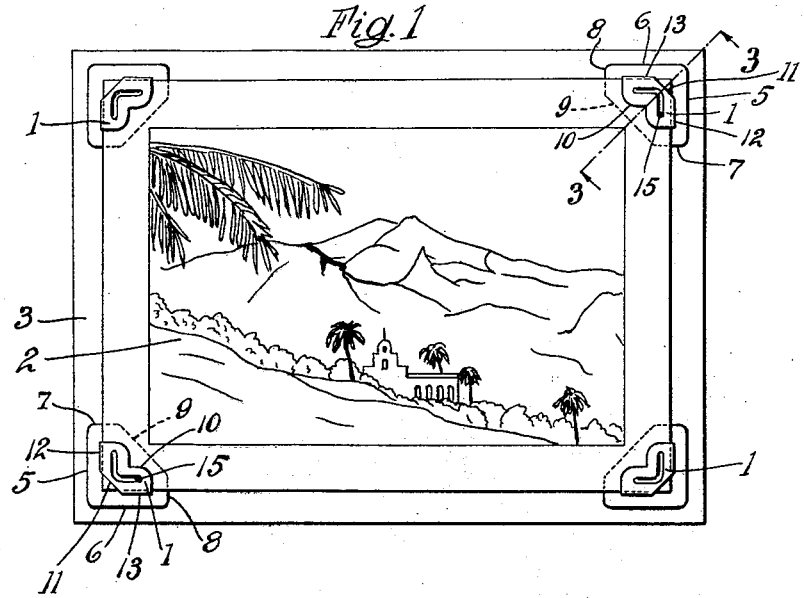
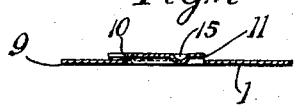
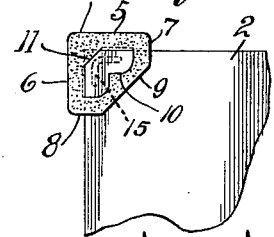
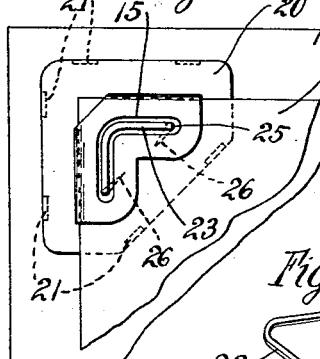
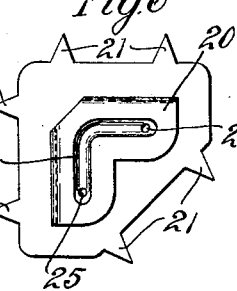
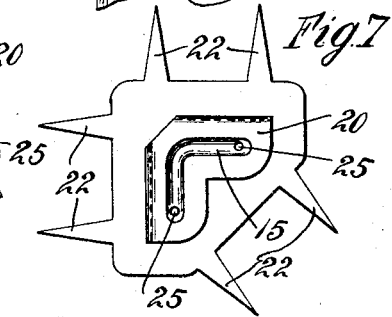
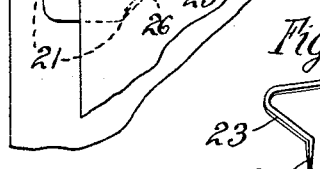
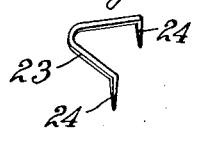
Inventor
Albert W. Engel
by Bondin & Bondin
his Attorneys.

Patented June 23, 1931

1,811,116

UNITED STATES PATENT OFFICE

ALBERT W. ENGEL, OF CHICAGO, ILLINOIS

PICTURE MOUNTING DEVICE

Application filed December 7, 1928. Serial No. 324,387.

The purpose of the present invention is to provide an improved device in the nature of a corner fitting for securing photographic prints, pictures, cards, plats, maps, and the like, to a suitable mounting in a convenient and attractive manner, and especially if the object to be mounted is provided with a margin or border of substantial extent. Another purpose is to provide a corner fitting especially suitable in cases where the mounted object is frequently inserted and extracted from the fitting, while the fitting remains secured in place on the mount. It consists in certain features and elements, in combination, herein shown and described, as particularly set forth in the appended claims.

In the drawings:—

Figure 1 is a face view of a picture provided with the improved corner fittings embodying this invention, and shown securing the picture on a mounting board.

Figure 2 is a sectional view taken medially through the intermediate corner of the fitting.

Figure 3 is a sectional view taken as indicated at line 3—3 on Figure 1.

Figure 4 is a rear view of the mounting device shown applied to a corner of a picture ready for securement to a mount.

Figure 5 is a face view of a corner fitting device of modified construction shown applied to a corner of a picture and securing the latter to a mount.

Figure 6 is a detail face view of the device of modified construction.

Figure 7 is a further modification, showing the device provided with relatively long tangs adapted to be inserted through and clinched over on the reverse side of a mounting board.

Figures 8 and 9 are perspective detail views of tacks or staples used in connection with the modified fittings.

For illustrative purposes my improved mounting device, indicated generally at 1, is shown applied to the corners of a picture, 2, for attaching the same to a mounting board, 3, or other suitable mounting members. These corner mounting devices are formed of sheet material, such as paper or cloth, gummed on one side for adhesive securement to the mounting board. Preferably, the mounting devices are of such outline as to present an ornamental and attractive appearance, and, as shown in the drawings, the outline comprises two outer longer sides, 5 and 6, disposed at right angles to each other, and two shorter sides, 7 and 8, connected at right angles to the respective sides, 5 and 6; the two shorter sides being joined by an oblique side, 9, extending parallel to a diagonal bisecting the angles formed by the jointure of the respective long and short sides. A slit, 10, is provided in the mounting device to receive the corner of the picture, card, etc., and, as shown, this slit preferably is of an ornamental outline with its ends terminating a substantial distance from the sides, 5 and 6. A second and smaller slit, 11, may be provided adjacent the intermediate corner formed by sides, 5 and 6, extending perpendicularly to the diagonal bisecting said corner and terminating approximately the same distance from the sides, 5 and 6, as the ends of the slit, 10. The portion or area of the mounting device defined by the slits, and the bend lines, 12 and 13, extending parallel to the sides, 5 and 6, respectively, and connecting the ends of the slits, is embossed and spaced upwardly from the remaining portion of the mounting device, as shown in Figure 2.

This embossed portion facilitates applying the corner fittings to the picture, card, etc., and due to such formation readily adapts itself to a wide range of thickness of the objects to be mounted, without causing distortion of any part of the fitting. As may be seen in the drawings, the slit, 11, permits the extreme corner portion of the picture to extend therethrough beyond the embossed portion and lap upon the upper surface of the remaining portion of the corner fitting. This formation insures proper alignment and fitting of the device to the corner of the picture and to some extent serves as a reinforcement.

A depression, 15, is formed in and occupies a substantial part of the embossed area with the bottom of the depression substantially flush with the bottom of the remaining portion of the mounting device, as may be seen in Figure 2. This depressed portion may be any form such as curved, linear, etc., but preferably the depression is formed in a suitable outline so that the entire embossed portion (which overlaps the corner of the picture) presents an attractive and artistic appearance; the depression is shown formed of two leg portions at right angles so as to conform to the general shape of the slit, 10. When the picture corner is inserted between the embossed portion and the remaining part of the mounting device it engages the bottom of the depression, 15, which yieldingly permits the picture corner to be shifted until it properly fits in the mounting device, with the result that the depressed portion, 15, becomes slightly sprung, as seen in Figure 3, bears firmly on the surface of the picture more firmly than the embossed portion would bear if it were simply a flat area. Thus the frictional engagement of the picture by the depression firmly holds the mounting device in place even without the use of adhesive attachment. The picture with its corner fittings thus applied is now ready for securement to the mounting board by moistening the remaining exposed portions of the gummed rear surface of the fittings, as seen in Figure 4.

It will of course be understood that if desired the fittings may also be adhesively secured to the picture, card, etc.; however, it is often preferable that the fittings be only frictionally engaged with the picture so that after the fittings are cemented to the mounting board, the picture or card may be easily removed without damaging or distorting the fittings. This feature is particularly important in cases where the pictures or cards are frequently inserted or extracted from their fittings. It will be understood that the general outline of the fitting may take several shapes, such as circular, triangular, etc., but in all cases the fitting will be designed so that the embossed portion overlaps a minimum area of the picture or card.

In many cases a more rigid and substantial corner fitting is essential, for which purpose I provide a modified construction as shown in Figures 5 to 9. The corner fitting, as indicated at 20, is preferably formed from relatively thin pliable sheet metal stock, and for illustrative purposes it is shown as having substantially the same general outline and construction as that shown in Figures 1 to 4, with the exception that it is formed with a plurality of tangs, 21, extending from the outer periphery and adapted to be forced into a mounting board for firmly retaining the fitting in place. Under certain conditions it may be desired to provide the fittings with relatively long tangs, 22, as shown in Figure 7, so that they may be projected through the mounting board and clinched over on the reverse side thereof for positively securing the fitting in position on its mount. This metallic fitting may be made in substantially the same manner as the paper or cloth fittings.

To further insure holding the object to be mounted in a definite fixed position on the mounting board, I provide a piercing fastener in the nature of a staple, 23, adapted to have its prongs, 24, projected through the apertures, 25, formed in the depressed portion, 15, of the fitting, and engaged in the mounting board. The head of the staple is preferably shaped to conform to the outline of the depression so that when it is driven into the mount it substantially fills the depression flush with the embossed surface. It will of course be understood that the depression could be formed to accommodate any suitable shape of fastener such as one having a single prong. Likewise, the staple may be provided with relatively long prongs, 26, as shown in Figure 9, so that they also may be projected clear through the mounting board and clinched over on the back side to make a relatively permanent mounting. Where the picture or the like is to be frequently removed from its fittings, the short pronged staples should be employed.

I claim :—

1. A device for mounting pictures and the like, consisting of a corner fitting of sheet material provided with two spaced apart slits having their respective ends terminating in a pair of planes perpendicular to each other and adapted to have a corner of a picture inserted through both of said slits, and having a depressed area intermediate said slits adapted to yieldingly engage the surface of the picture for frictionally maintaining said fitting in place, and means for attaching said fitting to a mounting member.

2. A device for mounting pictures and the like comprising a corner fitting of sheet material formed with a slit therein, and an embossed area having one edge thereof terminating at said slit, said embossed area being provided with a depressed portion adapted to yieldingly engage the picture and yieldingly maintain the fitting in place thereon when the corner of the picture is inserted in said slit, together with means for securing the fitting to a mount therefor.

3. A device for mounting pictures and the like, comprising a corner fitting of sheet material, provided with two spaced apart slits, and an embossed area having two free edges coinciding with said slits, said embossed area being provided with a depressed portion intermediate said slits, whereby the insertion of a corner of a picture through said slits causes said depressed portion to tightly engage the surface of the picture and frictionally hold it in place, said fitting being provided with means for securement to a mounting member.

4. In a mounting device as defined in claim 3, said depressed portion being adapted to be slightly sprung when engaging the picture, causing the free edges thereof to frictionally engage the surface of the picture.

5. A device for mounting pictures and the like, consisting of a corner fitting of metallic sheet material having a slit formed therein and provided with an embossed area having one edge coinciding with the slit, and adapted for permitting insertion of a corner of a picture through said slit, said fitting being formed with tangs extending from its marginal edges adapted to be projected into a mounting board for securing the fitting in fixed relation.

6. A device for mounting pictures and the like, consisting of a corner fitting of metallic sheet material having a slit formed therein and an embossed area having an edge coinciding with the slit and arranged to permit insertion of a corner of a picture therein, said fitting being formed with tangs adapted to be projected into a mounting member for securing the fitting in fixed relation, and a piercing fastener adapted to have its prong extended through said embossed portion of the fitting, through the corner of the picture and into the mounting member for fixing said picture in position in the fitting.

7. A device for mounting pictures and the like, consisting of a corner fitting of metallic sheet material having a slit formed therein and an embossed area having an edge coinciding with the slit and arranged to permit insertion of a corner of a picture therein, said fitting being formed with tangs adapted to be projected into a mounting member for securing the fitting in fixed relation, said embossed area having a depressed portion bearing on the inserted corner of the picture; and a piercing fastener, having one or more prongs adapted to be extended through the depressed portion of the fitting and through the picture corner into the mounting member and a portion formed to fit into the depression of the embossed area.

8. A device for mounting pictures and the like, consisting of a corner fitting of metallic sheet material provided with a slit therein for the insertion of a corner of a picture and a depressed portion adjacent the slit adapted to frictionally engage the surface of the picture for yieldingly securing the same in the fitting, and means for securing said fitting in fixed relation to a mounting member, including a plurality of tangs thereon adapted to be projected into the mount.

9. A device for mounting pictures and the like, comprising a corner fitting of metallic sheet material having two spaced apart slits formed therein and an embossed area having two free edges coinciding with said slits, and arranged to permit insertion of a corner of a picture therein, said embossed area having a depressed portion intermediate the slits adapted to resiliently impinge against the picture for holding it in place, a piercing fastener having one or more prongs adapted to be projected through the depressed portion of the fitting and through the picture corner, into the mounting member, said fastener having a head portion adapted to seat in said depression substantially flush with the embossed surface, and means for securing the fitting to the mounting member.

10. In the mounting device defined in claim 1, said depressed area including two angularly related portions for distributing the frictional contact with the picture over a relatively large area.

ALBERT W. ENGEL.